(12) United States Patent
Lebreton et al.

(10) Patent No.: US 11,633,258 B2
(45) Date of Patent: Apr. 25, 2023

(54) POWDER CHAMBER AND STATION FOR A POWDER CHAMBER

(71) Applicant: FERTON HOLDING S.A., Delémont (CH)

(72) Inventors: Etienne Lebreton, Crissier (CH); Florent Jean-Claude Georges Beani, Gex (FR); Bertolote Tiago, Geneva (CH); Marcel Donnet, St Jean de Gonville (FR)

(73) Assignee: FERTON HOLDING S.A., Delémont (CH)

( * ) Notice: Subject to any disclaimer, the term of this patent is extended or adjusted under 35 U.S.C. 154(b) by 1184 days.

(21) Appl. No.: 16/075,413

(22) PCT Filed: Feb. 3, 2017

(86) PCT No.: PCT/EP2017/052331
§ 371 (c)(1),
(2) Date: Aug. 3, 2018

(87) PCT Pub. No.: WO2017/134195
PCT Pub. Date: Aug. 10, 2017

(65) Prior Publication Data
US 2019/0038381 A1 Feb. 7, 2019

(30) Foreign Application Priority Data
Feb. 4, 2016 (EP) ..................................... 16154213

(51) Int. Cl.
*A61C 3/025* (2006.01)
*B24C 3/02* (2006.01)
(Continued)

(52) U.S. Cl.
CPC ................ *A61C 3/025* (2013.01); *B24C 3/02* (2013.01); *B24C 3/06* (2013.01); *B24C 7/0046* (2013.01);
(Continued)

(58) Field of Classification Search
CPC .... B24C 1/04; B24C 3/02; B24C 3/06; B24C 7/0046; B24C 7/0069; B24C 9/00; A61C 3/02; A61C 3/025
(Continued)

(56) References Cited

U.S. PATENT DOCUMENTS 2,696,049 A  12/1954  Black
2,825,135 A   3/1958  Tilden
(Continued)

FOREIGN PATENT DOCUMENTS

DE  102012109797 A1  4/2014
EP      0097288 A2   1/1984
(Continued)

OTHER PUBLICATIONS

International Search Report for corresponding application PCT/EP2017/052331 filed Feb. 3, 2017; dated Apr. 12, 2017.
(Continued)

*Primary Examiner* — Eileen P Morgan
(74) *Attorney, Agent, or Firm* — Cantor Colburn LLP

(57) ABSTRACT

A powder chamber, in particular for powder polishing devices, including a casing and two functional sectors, whereby the two functional sectors are arranged to be opposite to each other, and whereby at least one functional sector is designed to provide an opening for a working medium such as air or a mixture of powder and air, and whereby the two functional sectors are designed to allow the
(Continued)

powder chamber to be locked. The two functional sectors are preferably arranged along an axis and are rotationally symmetric.

11 Claims, 2 Drawing Sheets

(51) Int. Cl.
| | |
|---|---|
| *B24C 3/06* | (2006.01) |
| *B24C 9/00* | (2006.01) |
| *B24C 7/00* | (2006.01) |
| *B24C 1/04* | (2006.01) |

(52) U.S. Cl.
CPC ............. *B24C 7/0069* (2013.01); *B24C 9/00* (2013.01); *B24C 1/04* (2013.01)

(58) Field of Classification Search
USPC ............. 451/99, 100, 101; 433/88, 89, 215
See application file for complete search history.

(56) References Cited

U.S. PATENT DOCUMENTS

| | | |
|---|---|---|
| 4,494,932 A | 1/1985 | Rzewinski |
| 5,199,229 A | 4/1993 | Herold |
| 5,503,553 A * | 4/1996 | Hines ................... A46B 11/063 601/162 |
| 6,030,212 A * | 2/2000 | Schuman ............. A61C 1/0084 433/80 |
| 7,980,923 B2 * | 7/2011 | Olmo ..................... A61C 3/025 451/100 |
| 10,751,674 B2 * | 8/2020 | Donnet ................. A61C 3/025 |
| 2005/0250070 A1 * | 11/2005 | Hamman ............... A61C 3/025 433/80 |
| 2008/0233540 A1 * | 9/2008 | Olmo ..................... A61C 3/025 451/99 |
| 2013/0236851 A1 * | 9/2013 | McDonough ........ A61C 17/028 433/89 |

FOREIGN PATENT DOCUMENTS

| | | |
|---|---|---|
| EP | 0143617 A2 | 6/1985 |
| JP | H11104149 A | 4/1999 |

OTHER PUBLICATIONS

Written Opinion of the International Searching Authority for corresponding application PCT/EP2017/052331 filed Feb. 3, 2017; dated Apr. 12, 2017.

International Preliminary Report on Patentability for corresponding application PCT/EP2017/052331 filed Feb. 3, 2017; dated Aug. 16, 2018.

* cited by examiner

POWDER CHAMBER AND STATION FOR A POWDER CHAMBER

TECHNICAL FIELD

The disclosure relates to a powder chamber, in particular for powder polishing devices used in dental hygiene and a station for a powder chamber.

BACKGROUND

Powder polishing devices of the kind discussed here are used in professional dental hygiene, using a mixture of powder and air to clean dental surfaces. In known devices, the necessary powder is made available either in the powder polishing device itself or in externally arranged powder chambers. For example, EP 0 097 288 B1 discloses a powder polishing device with a powder container into which a compressed gas is introduced, such that the powder located there is swirled and can be removed as a mixture of powder and air via an outlet opening. The powder container is inside the powder polishing device and can always be refilled with powder from above. However, these systems in which the powder is filled directly into the powder polishing device are not flexible, especially when a change is required between different kinds of powder.

The chambers arranged externally such as those disclosed in U.S. Pat. No. 7,980,923 B2 or DE 10 2012 109 797 B, which are based on developments by this applicant, show advantages in this respect, but do not contain any safety arrangements and therefore can also be opened while under pressure. Furthermore, the connecting sector or the connector with which the powder chamber is connected to the powder polishing device is elaborately designed since it has to include not only the locking means of the powder chamber, but also a drain to remove the mixture of powder and air. In particular with regard to the removal of the mixture of powder and air, there is often contamination in the area of these connectors, which means that the powder chamber can sometimes only be replaced, for example after being refilled, after elaborate cleaning. This prevents quick and effective operation. Furthermore, the attachment of the powder chamber requires skill, since the contact matrix must be exactly "hit".

BRIEF SUMMARY

The disclosure provides a powder chamber, in particular for powder polishing devices, a station for a powder chamber or for a powder polishing device, and a method for operating a powder polishing device which eliminates the said disadvantages and is nevertheless of simple and cost-effective design.

According to the disclosure, a powder chamber, in particular for powder polishing devices used in dental hygiene, comprises a casing and two functional sectors whereby the two functional sectors are substantially arranged to be opposite to each other, whereby at least one functional sector is designed to provide an opening for a working medium such as air, in particular compressed air, or a mixture of powder and air, and whereby the two functional sectors are designed to allow the powder chamber to be locked. According to one embodiment of the disclosure, the two functional sectors are preferably arranged along an axis and are rotationally symmetric.

While the powder chambers known from the nearest state of the art as a rule have only one functional sector which must provide the locking function as well as the feeding and removal function of the working media, the above mentioned powder chamber has the advantage of two functional sectors, thus separating the two functions if necessary. The fact that the two functional sectors are also arranged to be opposite to each other has the effect that the powder chamber can be locked and sealed by jamming, compressing or otherwise manipulating it, in particular by means of a force/pressure build-up. The force necessary for that, especially the closing force, which advantageously acts along the powder chamber, in particular in longitudinal direction of the powder chamber, is in a range of about 5 to 800 N in a variety of embodiments.

According to one embodiment, an insert/powder container, such as a substantially funnel-shaped insert, is arranged inside the powder chamber, in particular inside the casing, which serves to hold the powder, such as a bicarbonate powder. According to one embodiment, the insert can also be designed as a "double funnel", beginning with a first funnel-shaped section, followed by a cylindrical section, followed by another funnel-shaped section. This configuration very effectively prevents plugging or blocking of the powder. According to one embodiment, a venturi nozzle is provided in the powder chamber which serves to mix or produce the mixture of powder and air. According to one embodiment, the casing and the insert (and also the venturi nozzle) are made of a plastic material. Advantageously, this is a transparent plastic which allows the monitoring of the powder's filling level. Suitably, the casing is also transparent or at least partly transparent. Furthermore, the transparency allows the operator to recognize powders of different colours, which for example correspond to the different taste varieties or grain sizes of the powders. Suitable powders are: Sodium hydrogen carbonate, Calcium carbonate, Erythritol and/or Glycine, preferably with an average particle size between 10 and 150 µm.

According to one embodiment, the casing is of a rotationally symmetric shape, i.e. in particular cylindrical, for example with a diameter of about 5 to 15 cm. According to one embodiment, the cylindrical powder chamber is arranged upright on a station or a corresponding powder polishing device.

With regard to the station, it should be mentioned that according to one embodiment, this term is to be understood synonymously to the term powder polishing device. This means that the station can contain the operating means, displays, electrical and mechanical connections such as for a hand-held device. Alternatively, the station can also just mean the component or means to accommodate the powder chamber. A station of such a design can also contain mechanical and electrical connections, but perhaps not any medication, operating means for adjusting the pressure, etc.

According to one embodiment, a first functional sector is a bottom plate form and force-fittingly connected with the casing, especially such that it can be connected and disconnected. The first functional sector or the bottom plate are suitably (also) made of a plastic material, which is a particular advantage in terms of cost and allows for a wide range of design in a simple manner. The attachment in or on the casing can be on its inside and/or outside, for example by means of an appropriate thread. However, it is also possible to design the bottom plate or the casing such that the bottom plate is only plugged in, for example into the casing or into the insert which would then be designed accordingly. In that casing, the bottom plate would be locked by being at least slightly prestressed through the casing or perhaps the insert. Since the first functional sector can be disconnected, expedient access into the casing is provided through which, for example, the said insert and/or the said venturi nozzle can be arranged in the powder chamber. Suitably, the access has the same cross section as the casing. In other words, the complete "bottom" of the powder chamber is designed so it can be detached.

According to one embodiment, a second functional sector is designed as an—especially detachable—closure element which is form and force-fittingly arranged on or attached to, in particular pinned to the casing. According to one embodiment, the casing is tapered in the area of the closure element, virtually forming a type of bottleneck. If the closure element is not attached, access is also provided, in particular a round or circular access into the powder chamber with a diameter of about 20 to 45 mm, in particular of about 25 to 35 cm. Via this "neck" or this smaller cross section, access is also provided into the powder chamber, through which powder can be refilled quickly and simply. It should be mentioned that the powder chamber does not have to have a tapering cross section in the upper area. There, the positive or nonpositive connection can also be established, for example, by a thread.

The second functional sector is opposite the first functional sector. Relative to the preferably cylindrical casing, which suitably is in an upright position, we can therefore also speak of a lower (first) functional sector and an upper (second) functional sector. However, they could also be left and right functional sectors, since the kind of locking does not depend on the position in space but the position of the two functional sectors in relation to each other, whereby these must be designed such that in casing of force application along or parallel to an axis connecting the two functional sectors, for example the rotational axis of the powder chamber, it becomes possible for the powder chamber to be braced, jammed, etc. In more general terms, force application can be in the direction from the first to the second functional sector and/or the other way round.

Suitably, the two functional sectors are provided with pressure surfaces or force application surfaces on the outside and substantially extending across the rotational axis, which are designed to affect pressure or a force upon the powder chamber, whereby these surfaces are round, in particular circular and/or also ring-shaped, and whereby these are suitably level or substantially smooth. Typical sizes of the areas for applying pressure/force are in the range of about 5 to 15 cm.

According to one embodiment, the second functional sector is designed as a plug that can be inserted in the casing, whereby the plug is formed cylindrically or at least in sections as a cone or truncated cone. Such a closing element or such a plug can preferably be inserted and removed without rotation and is sufficient to reliably close the casing for storing and handling purpose. Thus, circumferentially, a substantially smooth sealing surface is achieved which, to stay with the example of the rotationally symmetrical casing, is slanted toward the rotational axis or may also extend parallel. According to one embodiment, the plug can be designed off-set, having areas of different diameters, which also allows sealing surfaces extending substantially vertical to the rotational axis. Advantageously, the plug can be manipulated with one hand, allowing that closure element to be plugged in as well as removed with one hand. While usually two hands are necessary for a threaded connection, the said plug can be attached, for example, by easily pushing it in and out with the thumb, thus allowing one-handed manipulation.

What has been said about the arrangement of the closure element and its design (in particular in terms of sealing surfaces) can also apply to the design and arrangement of the bottom element, and vice versa. To optimize the sealing between the casing and the (removable) functional sectors, sealing elements in the form of O rings are provided in suitable places in addition to the design/form of the sealing areas.

According to one embodiment, the casing and the first functional sector or the bottom plate can also be made in one piece, but then the other access has to be designed such that piece, but it is possible to arrange the inlet or the venturi nozzle.

According to one embodiment, the powder chamber is designed such that locking it causes the powder chamber to be pressure sealed, in particular when locking it is provided by force application along an axis from one functional sector to the other, in particular for example along the rotational axis, whereby the force is, for example, in a range of about 5 to 800 N, depending on the various embodiments. This means that for instance the closure element is arranged by a user in or on the casing, thereby closing and sealing the chamber, but that this arrangement may not yet pressure seal the casing/powder chamber. This applies analogously and correspondingly to the first functional sector or the bottom plate. The actual pressure sealing is affected only by locking the powder chamber, for example with a corresponding arrangement/station which jams or braces the powder chamber or the casing and the functional sectors. For this, advantageously, the two functional sectors are arranged substantially opposite to each other, allowing the bracing or jamming of the powder chamber along an axis extending between the two functional sectors. Suitably, the force is applied via the two already mentioned force application areas/pressure surfaces of the functional sectors. Depending on the embodiment, sealants/seals such as O rings, etc. can be used to enhance the sealing function against pressure loss.

Additionally or alternatively, the locking means also (tightly) couples the connections for the supply/removal media, i.e. especially the inlet/outlet in the functional sectors.

According to one embodiment, the powder chamber as such can also be arranged "tightly" in the station, such that in fact the functional sectors only have a locking function. This can be done via an appropriate positive or nonpositive connection such as a screw connection through which the functional sectors(s) are arranged in the powder chamber.

According to one embodiment, the powder chamber is designed/built for a pressure load of about 2.0 to 5.5 bar. A minimum pressure is in the range of about 1 bar, while a maximum pressure is in a range of about 10 bar.

According to one embodiment, the first functional sector comprises an opening designed as an inlet for a medium, in particular (compressed) air. According to one embodiment, the second functional sector comprises an opening designed as an outlet for a medium, in particular air or a mixture of powder and air. Suitably, air is provided from below while the mixture of powder and air is removed via the second upper functional sector. Suitably it can thus be easily prevented that powder or the like collects in the lower functional sector which could contaminate the functional sector. Apart from that, the described arrangement can also be designed exactly the opposite way, such that the compressed air is taken in at the top and the mixture of powder and air is removed at the bottom. The input as well as the outlet can also be arranged in a functional sector. With the locking means chosen here for the powder chamber—by means of jamming or bracing—the connectors or connecting sections of the station/the powder polishing device can be of clearly simpler design which almost prevents contamination by residual powder from the start.

It has been found a great advantage when the closure element forms the outlet for the mixture of powder and air, since this can very quickly provide a very variable powder chamber system, for example by using different closure elements that have outlets with different cross sections or orientation. According to one embodiment, the outlet in the closure element is designed such that the outlet is formed laterally in the closure element, for example by means of a substantially horizontal drill hole which, according to one embodiment merges into a vertical drill hole, finally leading the mixture of powder and air outside. The initially horizontal drill hole has the advantage that the outlet is not in the main stream direction which substantially extends along the venturi nozzle. This geometry or this path is not only relatively easy to produce (only two simple drill holes) but can also be extended or adapted at will.

According to a preferred embodiment, the powder chamber is formed rotationally symmetrical, with the openings in the functional sectors suitably lying on the rotational axis. This in particular facilitates the handling of the powder chamber, since when positioning the powder chamber at a station or a powder polishing device, the operator does not have to watch whether for example a special angle has to be maintained relative to the station. Even when a functional sector has two openings, these can be arranged rotationally symmetrical, for example when one surrounds the other annularly. For the sake of completeness it is mentioned that the functional sectors can be provided with several connections or openings, and as a matter of principle these should be, at least preferably, of rotationally symmetrical design and arrangement. According to one embodiment, at least one functional sector comprises a recess/depression which can prevent a lateral displacement of the powder chamber, in particular via corresponding lateral surfaces. The recess/depression is formed in such a way that a correspondingly congruent counterpart on a station engages in this recess/depression, allowing the powder chamber to be securely fastened or held, especially also across the rotational axis. According to one embodiment, for example, the functional sector has a concave recess/curvature. In addition, a centrally positioned depression advantageously allows the centering of the powder chamber.

Alternatively, at least one functional sector can also be provided with at least one projection or for example a convex projection/process or a corresponding curvature, whereby the above description for the recess/depression applies analogously and correspondingly.

According to one embodiment, one of the said openings for the working medium is arranged centrally in the area of the recess/depression (or process/projection) of a functional sector. Annularly to it and offset along the rotational axis is the actual pressure surface used to lock/prestress the powder chamber. Therefore, a kind of cascading or functional separation is provided, and of course a force must/can be exerted in the area of the recess/depression to seal the openings/accesses in a suitable manner. Suitably, a sealing element such as an O ring is arranged here as well.

According to one embodiment, the powder chamber is magnetic at least in part, especially around the circumference, or has a magnetic area or section. This allows an at least partly surrounding magnetic ring to be fastened to the casing. This ring can be pasted to the seal or can be braced via the first functional sector or via the bottom plate.

The disclosure also related to a station, in particular for powder polishing devices, whereby the station is provided with two substantially opposite connecting sections, especially one lower and one upper connecting section, whereby the connecting sections are designed to hold positively or nonpositively or arrange a powder chamber, in particular a powder chamber according to the disclosure, with two functional sectors. Regarding the station, the description above applies, according to which the station can be the powder polishing device itself, comprising appropriate operating elements for adjusting the pressure and the rate of flow. Alternatively, the station can also be connected with another device that has the above mentioned characteristics, such that the station as such substantially only serves to arrange and supply the powder chamber as such.

According to one embodiment, each connecting section comprises at least one projection/process designed to engage in appropriately configured functional sectors of the powder chamber. As already mentioned, here the functional sectors are suitably provided with one or several appropriate recesses/depressions. Of course, the concept can also be reversed, such that the functional sector is provided with the process/projection.

According to one embodiment, the station is provided with a jamming mechanism which is configured to move at least one of the connection sections, especially in the direction of the other functional sector, which can cause the powder chamber to be locked, particularly by bracing or jamming the two functional sectors to each other. According to one embodiment, the jamming mechanism can be a pneumatic system. A mechanical system based on an electric motor with an appropriately designed transmission is also possible. A mechanical lever system can also be provided which the user can operate manually. In that casing, the user moves a lever after inserting the powder chamber in the station and braces or jams the station manually.

Suitably, the station comprises a carrier structure that comprises the connecting sections. According to one embodiment, the carrier structure can be of substantially U shaped design or formed as a bow, whereby the two shorter "arms" surround the connecting sections and whereby the two arms are connected by a web which extends substantially along and beside the powder chamber. This allows very good accessibility to the powder chamber and facilitates its arrangement. Preferably, the carrier structure has sufficient stiffness to allow the locking of a powder chamber without the carrier structure being deformed. Suitably, the carrier structure is made of a firm plastic, but particularly of a metal such as aluminum or steel. Advantageously, the carrier structure can also be built as a kind of framework or with appropriate bracing that provides the necessary stiffness.

As already mentioned, the powder chamber is designed, for example, for an external force of about 5 to 800N which holds and locks the chamber in between respective connecting sections of the station. This is the force or pressure needed to lock the powder chamber, i.e. especially a pressure applied on the outside. Such force can be applied by e.g. activating a pneumatic device at one of the connecting sections, opposite of one or both of the functional sectors, e.g. underneath the lower connecting section, with a pressure of 1 to 5.5 bar. Such pressure is designed to be higher than the internal pressure (static pressure) of the chamber so as to avoid that the closure element is removed and/or powder will spill out.

In operation the powder chamber is also pressurized itself (i.e. inside), whereby one can distinguish between static pressure and working pressure. Working pressure is the pressure in the powder chamber when medium/powder leaves the nozzle, while static pressure is the pressure in the powder chamber when no medium/powder leaves, but the powder chamber is under pressure. The working pressure is usually lower than the static pressure.

Typical values for the static pressure are in the range of about 2 to 5 bar, preferably between about 2.5 and 4.5 bar. Values for the working pressure are in the range of about 1.5 to 3.5 bar, preferably in a range between about 1.7 and 3.2 bar.

It has been proven advantageous not to build up the static pressure suddenly, but for instance in one or more steps. This means that the pressure in the powder chamber is increased first, for example, to about 2 bar, and then after a certain waiting period in which the pressure in the powder chamber has stabilized, it is in creased to the desired target reading. In preferred embodiments, an insert/powder container is arranged or inserted in the powder chamber. The pressure in the powder chamber influences its arrangement since the pressure also affects the insert. If the pressure in the powder chamber is increased suddenly, the insert can be jammed relative to the powder chamber. A stepwise or ramp-shaped increase of the static pressure can advantageously counteract that.

Alternatively, it can also be provided that at least one of the connecting sections is prestressed in a suitable way, for example via a spring mechanism which very simply allows the powder chamber to be prestressed. In that casing, the powder chamber is jammed directly upon insertion, not requiring any further steps. According to another embodiment, the connecting sections are also designed or arranged against each other such that the powder chamber initially stands "freely" as long as it has not yet been locked.

In principle, it should be mentioned here that in relation to the powder chamber as well as in relation to the station, the jamming or bracing of the powder chamber not only affects the sealing of the powder chamber but also the sealing of the functional sectors of the powder chamber relative to the connecting sections of the station. Thus, the connection sections to the openings of the functional sectors are provided with congruently designed inlets/outlets. According to one embodiment, the lower connecting section for example, which is designed congruently to the first functional sector of the powder chamber, is provided with a corresponding connection or inlet for supplying the powder chamber with air/compressed air. The upper connection section, which suitably is designed congruently to the second functional sector of the powder chamber, is provided with a corresponding outlet for a mixture of powder and compressed air. In that casing, the rotationally symmetrical design of the powder chamber and its functional sectors is again an advantage, allowing a quick arrangement of the powder chamber in the station, since the user can quasi make no mistakes.

According to one embodiment, both connecting sections are substantially round, in particular circular and dimensioned such that they at least slightly protrude the diameter of the corresponding functional sectors, allowing a very even pressure or force application from the connection sections to the functional sectors.

Suitably, the station has a magnetic section or a magnet which interacts with the said magnet or magnetic ring on the powder chamber. This automatically pulls the powder chamber into the right position when it is arranged in the station.

Suitably, the station is provided with one or more positioning means, for example in the form of sockets or bolts, which can serve to position or align the powder chamber.

According to one embodiment, the station comprises an arranging aid designed to facilitate an arrangement of the powder chamber, whereby the arranging aid comprises the magnetic area and at least one positioning means.

The disclosure also refers to a method for operating a powder polishing device, comprising the following steps:
  arranging a powder chamber, in particular a powder chamber according to the disclosure, in a station, in particular in a station according to the disclosure, or in a powder polishing device;
  jamming or bracing the powder chamber;
  introducing compressed air into the powder chamber.

Thus, the method or the powder chamber according to the disclosure and/or the station according to the disclosure allow the very safe operation of the powder chamber and in particular prevent a removal of the powder chamber from the station when the powder chamber is still under pressure. The method is designed such that the powder chamber is only released from the station when the pressure has been released from the powder chamber. For example, according to one embodiment, the said jamming mechanism is designed such that it only "frees" the powder chamber after the pressure in the powder chamber was released. The described form on the functional sectors/connection sectors prevents a user simply to "pull out" the powder chamber, in particular across the rotational axis. Suitably, the station is provided with a light unit or the like which indicates whether the system is under pressure.

All the characteristics and advantages named with regard to the powder chamber also apply to the station and the method and vice versa.

BRIEF DESCRIPTION OF THE DRAWINGS

Other advantages and characteristics result from the following description of preferred embodiments of the powder chamber according to the disclosure and the station according to the disclosure with reference to the attached drawings. The individual characteristics can be combined with each other within the framework of the disclosure. In the attached drawings

DETAILED DESCRIPTION

Figure 1:
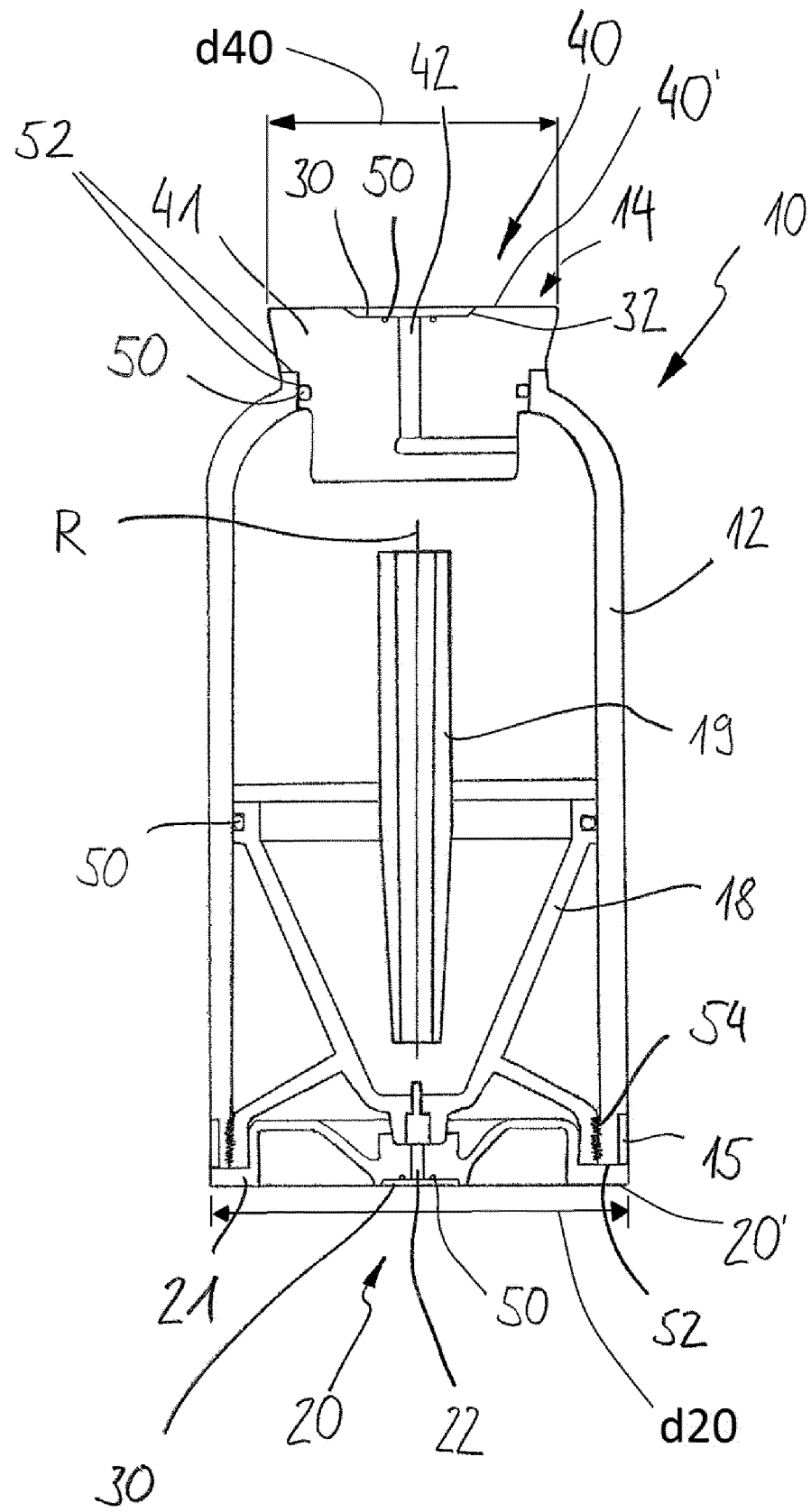
FIG. 1 shows a view of an embodiment of the powder chamber in cross section.

FIG. 1 shows a powder chamber 10 comprising a casing 12. The powder chamber 10, which is substantially of rotationally symmetrical design (see rotational axis R) comprises a first lower functional sector 20 and a second upper functional sector 40. The upper functional sector 40 is formed by a closure element 41 which is arranged within an access 14 formed by an upwardly tapering section of casing 12. Closure element 41 comprises an outlet 42 formed by two drill holes. Closure element 41 also comprises a recess/depression 30 in whose area a seal 50, here in the form of an O ring, is provided. Closure element 41 is also sealed toward casing 12 via a sealing element 50. At the contact surfaces between casing 12 and the functional sectors 20, 40 are appropriate sealing surfaces or sealing walls (52) which in the embodiment shown here extend substantially along or across rotational axis R. Within casing 12, an insert 18 and a venturi nozzle 19 are provided. Insert 18 is sealed toward casing 12 via an appropriate seal 50. In the lower area, the powder chamber 10 comprises the first functional sector 20 which in the embodiment shown here is plugged inside insert 18 which is screwed to casing 12 with a thread 54. To be noted is a seal 50 at the first functional sector 20 which is similarly designed at functional sector 40.

When a force or pressure is applied to the first functional sector 20 as well as the second functional sector 40, this is a simple method of sealing powder chamber 10. The first functional sector 20 designed as a bottom plate 21 comprises an inlet 22 for air, in particular compressed air, whereby a seal 50 is provided concentrically to inlet 22. In the area of inlet 22, the bottom plate 21 is also provided with an appropriate recess/depression 30 which in particular serves to arrange powder chamber 10 in a correspondingly congruently designed station or a correspondingly congruently designed powder polishing device. In particular, lateral surfaces 32 of recess/depression 30 can prevent that powder chamber 10 is pulled out, for example out of a station. Above bottom plate 21, a circulating magnetic ring 15 is provided which is meant to facilitate the positioning of powder chamber 10 in a station or in a powder polishing device. The first functional sector 20 has a diameter d20 while the second functional sector 40 has a diameter d40. Finally derived from these diameters are force application sectors or pressure surfaces 20' and 40' via which the force/pressure can be applied to brace or jam powder chamber 10.

The opening 42 is, according to one embodiment of the present disclosure, a central opening, parallel to the axis R, directed from one functional sector 20 to the other functional sector 40, wherein the mixture outlet for a mixture of powder and air, facing the inside of the powder chamber 10, is arranged angled to such axis R, preferably perpendicular. Such arrangement prevents that the powder/air mixture, exiting the venture nozzle, will impinge on such outlet, which leads to an uneven flow, but the powder/air mixture leaves the powder chamber through such mixture outlet at a region where an even distribution of the mixture can be achieved, usually sideways spaced apart from the centre of the upper functional sector 40.

Figure 2:
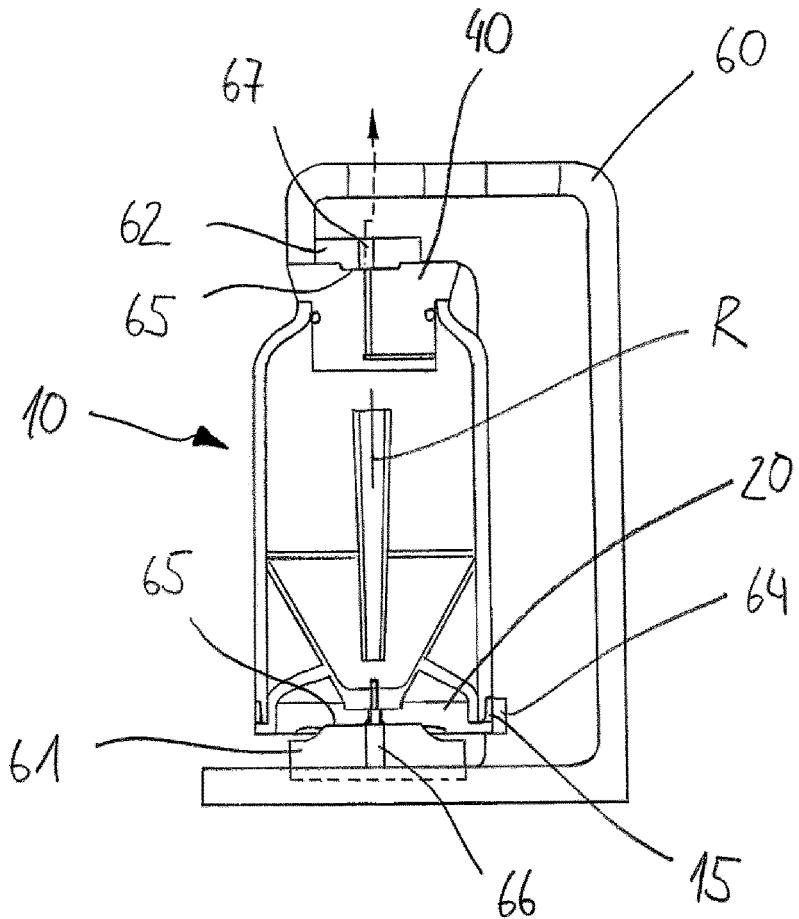
FIG. 2 shows an embodiment of a station in which the powder chamber is arranged.

FIG. 2 shows an embodiment of a station 60 in which a powder chamber 10 is arranged. The basic structure of this powder chamber 10 is the same as that known from FIG. 1, and therefore no detailed description is necessary. However, it should be noted that there is a magnetic ring 15 of powder chamber 10, which is shown here to suitably interact with a magnetic area 64 provided in station 60. This allows powder chamber 10 to be easily "pulled into" station 60. Station 60 comprises a lower connecting section 61 and an upper connecting section 62, which in the embodiments shown here are both provided with appropriate projections/processes 65. This allows an ideal interaction with the correspondingly designed first functional sector 20 or the correspondingly designed second functional sector 40. The station is substantially U-shaped and can therefore surround the powder chamber in the fashion of a screw clamp. A carrier structure, which gives the station its appropriate strength/stiffness, is not shown here for the sake of simplicity. Projections/processes 65 and the corresponding recesses/depressions 30 in functional sectors 20, 40, allow the positioning a well as locking or fastening of powder chamber 10 in the correct position. The upper connecting section 62 comprises a corresponding outlet 67 of a mixture of powder and air, whereby the dotted arrow only indicates that station 60 may be provided with a corresponding connection or exit for removing the mixture of powder and air. As indicated here, this removal may be upward leading out of the device, but alternatively also within the device at any other place toward the outside. A jamming mechanism, designed to move the lower connecting section 61 and/or the upper connecting section 62 along a rotational axis R of powder chamber 10, is not shown here. However, the dotted lines in the area of the lower connecting section 61 indicate that for instance the move can be toward the bottom, which would allow powder chamber 10 to be easily removed from station 60.

Figure 3:
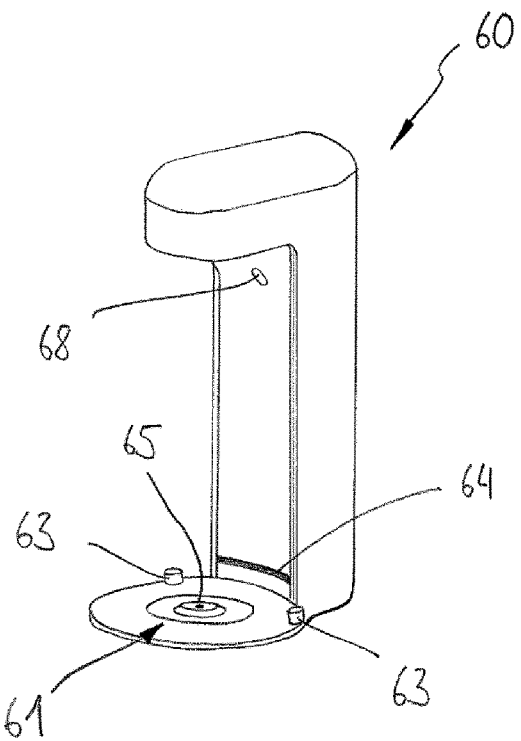
FIG. 3 shows an embodiment of a station in a perspective view.

FIG. 3 shows a perspective view of an also substantially U-shaped station 60, whereby a lower connecting section 61 can be seen with a process 65. One arrangement of a powder chamber can be such that it is inserted by its second (upper) functional sector into station 10 at a corresponding upper connection section (not shown here) and is then automatically pulled via a magnet 64 and with the help of a stud/peg 63 into the correct position on the lower connecting section 61, while the used does not have to watch for the exact positioning. Suitably, station 60 also comprises a light source 68 which can indicate, for example, that the powder chamber is under pressure. It can also be used to illuminate the interior of the powder chamber which is suitably transparent or at least partly transparent, and this allows, for example, to very accurately read a filling level.

The invention claimed is:

1. A station, in particular for powder polishing devices, the station comprising:
   two substantially opposite connecting sections, and
   a powder chamber held by the connecting stations,
   wherein the powder chamber comprises:
      a casing,
      a first functional sector, and
      a second functional sector,
      wherein the first functional sector and the second functional sector are arranged to be opposite to each other such that the first functional sector interacts with a first of the connecting stations and the second functional sector interacts with a second of the connection stations,
      wherein the first functional sector or the second functional sector is designed to provide an opening for a working medium such as air or a mixture of powder and air,
      wherein the station comprises a jamming mechanism designed to move at least one of the connecting sections such that the powder chamber can be locked,
      wherein the first functional sector is a bottom plate and the second functional sector is a closure, and
   wherein a jamming force is in direction of the first functional sector from one of the connecting stations and in the direction of the second functional sector from the other connecting station.

2. The station according to claim 1, wherein the first functional sector is a bottom plate which is form-fitting, force-fitting, and removable, connected with the casing.

3. The station according to one of the claim 2, wherein the second functional sector is designed as a removable closure element arranged form-fittingly and force-fittingly on the casing.

4. The station according to claim 2, wherein the locking causes the powder chamber to be sealed, wherein the locking is by means of force application along an axis directed from one functional sector to the other functional sector.

5. The station according to claim 2, wherein the first functional sector comprises an opening designed as inlet for the working medium.

6. The station according to claim 3, wherein the second functional sector comprises a further opening designed as an outlet for a mixture of powder and air.

7. The station according to claim 6, wherein the further opening is a central opening, parallel to the axis directed from one functional sector to the other functional sector, wherein the outlet, facing the inside of the powder chamber, is arranged angled to such axis.

8. The station according to claim 6 wherein the powder chamber is designed rotationally symmetrical to the axis and that the openings of the functional sectors are substantially on the rotational axis.

9. The station according to claim 2, wherein at least one functional sector is provided with a recess which is designed to prevent lateral displacement of the powder chamber.

10. The station according to claim 2, wherein the powder chamber is at least partly magnetic.

11. The station according to claim 1 comprising an arrangement aid designed to facilitate an arrangement of a powder chamber.

* * * * *